United States Patent

[11] 3,631,452

| [72] | Inventor | Willard H. Richard<br>42865 Jefferson St., Fremont, Calif. 94538 |
|---|---|---|
| [21] | Appl. No. | 786,029 |
| [22] | Filed | Dec. 23, 1968 |
| [45] | Patented | Dec. 28, 1971 |

[54] WORK-SCHEDULING APPARATUS
3 Claims, 5 Drawing Figs.

[52] U.S. Cl. ...................................... 340/309.5,
235/92 PD, 340/309.1
[51] Int. Cl. .................................................. G04c 23/00
[50] Field of Search ........................................... 340/309.5,
309.1, 309.3, 309.4, 22, 23, 332; 235/92 (27), 92 PD

[56] References Cited
UNITED STATES PATENTS

| 2,932,779 | 4/1960 | Tancig | 340/309.4 X |
| 3,003,687 | 10/1961 | Bell | 235/92 (27) X |
| 3,187,319 | 6/1965 | Crawford | 340/309.1 |
| 3,275,987 | 9/1966 | Mann | 235/92 (27) X |
| 3,321,704 | 5/1967 | Mann | 235/92 (27) X |

Primary Examiner—John W. Caldwell
Assistant Examiner—Scott F. Partridge
Attorney—Boniard I. Brown ABSTRACT: Work-scheduling schedulaing apparatus for indicating the status of a number of work-performing media which may be either men or machines. The scheduling apparatus embodies a number of indicator sets to be associated with the work-performing media, respectively, whose work is to be scheduled. Each indicator set includes a first indicator for indicating the availability of the corresponding work-performing medium to perform its respective task and a second indicator for indicating the period of time which the corresponding medium, when occupied, has been engaged in its respective task and hence the remaining time required to complete the task.

Patented Dec. 28, 1971
3,631,452
2 Sheets-Sheet 1
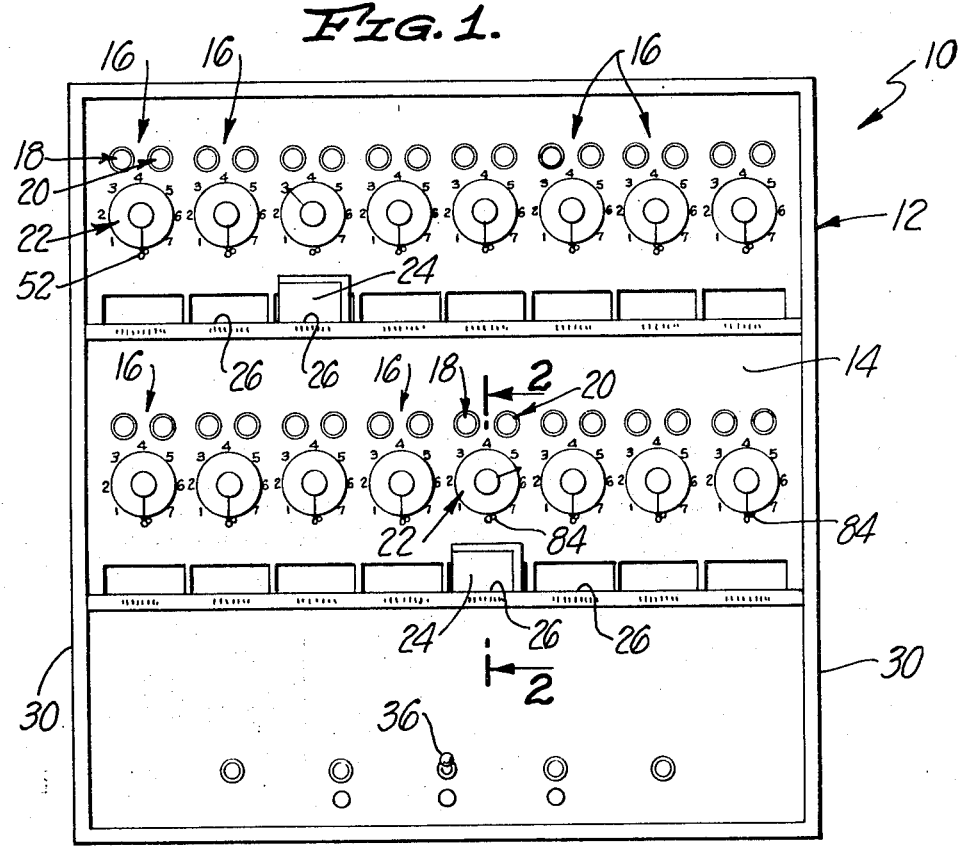
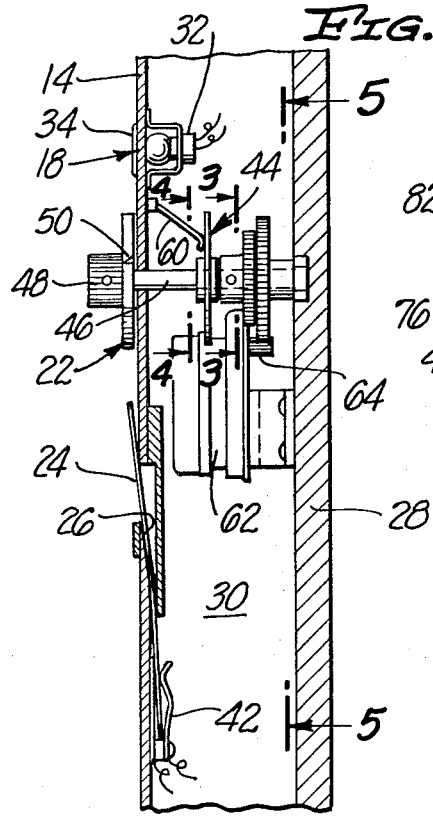
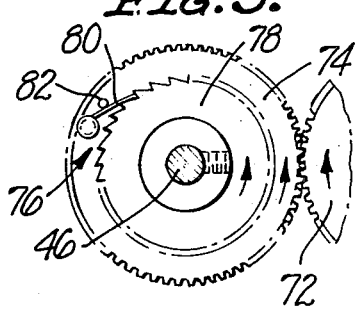
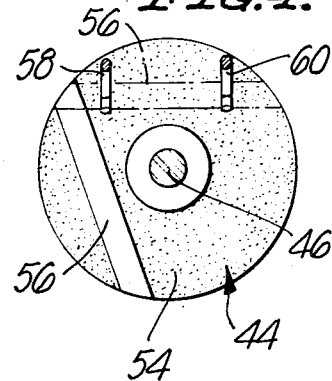
INVENTOR
WILLARD H. RICHARD
BY
ATTORNEY

INVENTOR
WILLARD H. RICHARD
BY
ATTORNEY

WORK-SCHEDULING APPARATUS

BACKGROUND OF THE INVENTION

1. Field of the Invention

This invention relates generally to the art of scheduling work for a number of work-performing media and more particularly to novel work scheduling apparatus for this purpose.

2. Prior Art

In the present disclosure, the expression "work-performing media" is intended to encompass various types of work performing media including both men and machines. However, the invention is concerned primarily with the scheduling of work to be performed by men, particularly automobile mechanics. For this reason, the invention will be described in connection with this particular application.

Most if not all new car dealers maintain large service facilities for servicing and repairing automobiles. Such a facility requires the employment of a relatively large number of mechanics who are skilled in the various facets of automobile servicing and repair. In order to assure continued profitable operation of the facility, the various jobs to be done each day must be assigned to the proper mechanics, that is scheduled, in such a way as to keep the mechanics constantly busy without creating bottle necks in the flow of work to the shop.

At the present time, when a customer enters an automobile service facility, he is met by a foreman who makes a record of the various jobs which the customer wishes to have done. These jobs are then assigned to the appropriate mechanics for performance in the order in which they arrive at the shop. Servicing and/or repair of a given car, of course, may and generally does require the services of two or more mechanics having different expertise. As a consequence, a substantial problem is involved in assuring continuous flow of work to the various mechanics in the proper order and timing to keep each mechanic busy at all times.

SUMMARY OF THE INVENTION

The present invention provides a work-scheduling apparatus which is particularly suited for scheduling job assignments to mechanics in such automobile service and repair facilities. In general terms, the work scheduling apparatus is characterized by a number of indicator sets to be associated with the various mechanics, respectively. Each indicator set includes a pair of indicators and a timer. One indicator, referred to herein as an availability indicator, indicates the availability of the corresponding mechanic to assume a new job assignment. The other indicator, referred to herein as a job status indicator, or simply a status indicator, indicates the current status of a job assignment being performed by the corresponding mechanic, i.e., whether or not his current job assignment is completed. The timer is used in conjunction with the job status indicator to indicate the length of time the corresponding mechanic has been engaged with a particular task and the length of time remaining before the task will be completed. It should be noted in this connection that the indications provided by the job status indicator and the job timer are based on an estimate of the time required to perform a selected task and not on the actual status of the assigned task.

In the particular embodiment of the invention selected for illustration, the several indicator sets are mounted on the front panel of a housing which is adapted to be situated at a convenient job monitoring station within the service and repair facility. This work-scheduling panel will be attended by a suitably trained work scheduler. The availability indicators, job status indicators, and timers of the several work indicator sets are arranged in an easily readable array about the work scheduling panel in such a way that the work scheduler may tell, at a glance, the availability of each mechanic to assume a new job assignment and the approximate length of time each occupied mechanic will require to complete his current job assignment.

Associated with the different indicator sets are slots for receiving conventional job cards of the type which are commonly used to keep track of job assignments in automobile repair and service facilities. When a job card is inserted into the slot for a given indicator set, the availability indicator of that set is switched from the state in which it indicates that the corresponding mechanic is unoccupied to a state in which it indicates that the mechanic is occupied with a job assignment. When the card is later withdrawn from the slot after completion of the job assignment, the availability indicator is automatically restored to its original state to indicate that the corresponding mechanic is unoccupied and hence available to assume a new job assignment. The job status indicator of each indicator set is controlled by the corresponding timer. Thus, when a new job is assigned to the corresponding mechanic, the timer is set to a position corresponding to the estimated time required of the mechanic to complete the task. This setting of the timer places the job status indicator in a state in which it indicates that the assigned task is not completed. At the expiration of the estimated time preset into the timer, the latter operates the job status indicator to a second state wherein it indicates completion of the assigned task by the corresponding mechanic. The timer also provides a continuous reading of the required remaining time for the mechanic to complete an unfinished task.

BRIEF DESCRIPTION OF THE DRAWINGS

FIG. 1 is a front elevation of a work scheduling apparatus or panel according to the invention;

FIG. 2 is an enlarged section taken on line 2—2 in FIG. 1;

FIG. 3 is an enlarged section taken on line 3—3 in FIG. 2;

FIG. 4 is an enlarged section taken on line 4—4 in FIG. 2; and

DESCRIPTION OF THE PREFERRED EMBODIMENTS

Figure 5:
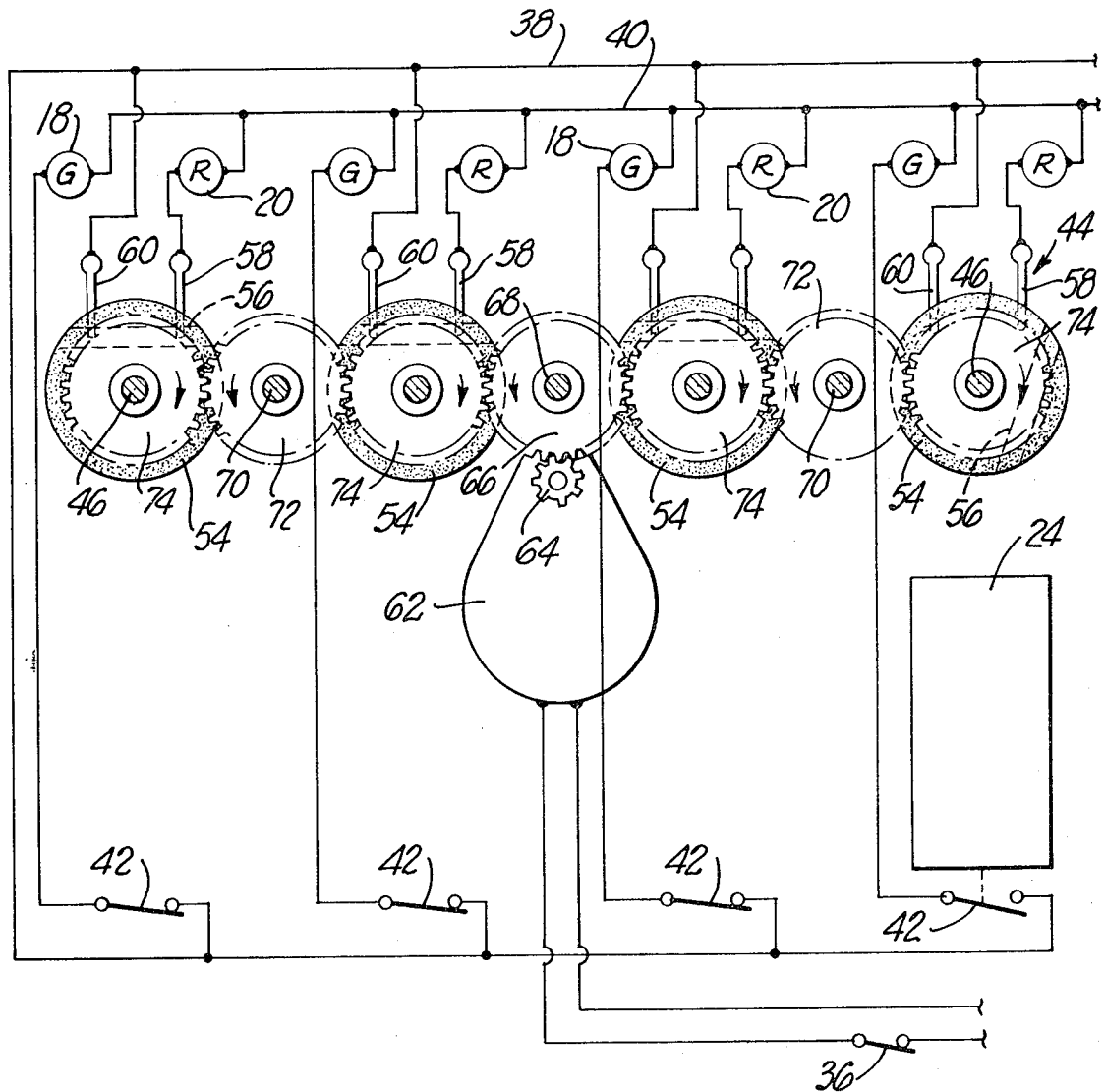
FIG. 5 is an enlarged section taken on line 5—5 in FIG. 2.

Turning now to these drawings, there is illustrated a work scheduling apparatus 10 according to the invention. This work scheduling apparatus has a housing 12 with a front panel 14. Mounted on the panel are a number of indicator sets 16 to be associated with the different work performing media whose job assignments are to be scheduled. As noted earlier, it will be assumed in this disclosure that the work performing media are automobile mechanics employed by an automobile service and repair facility.

The several indicator sets 16 are essentially identical. Accordingly, a description of one will suffice for all. With this in mind, it will be seen that each indicator set 16 includes a pair of indicators 18 and 20 and a presettable timer 22. Indicator 18 indicates the availability of the corresponding mechanic to assume a new job assignment and is hereinafter referred to as an availability indicator. Indicator 20 indicates the status of the job assigned to the corresponding mechanic; that is to say, this indicator indicates the length of time the corresponding mechanic has been working on a particular job assignment and the length of time required for the mechanic to complete the job assignment. For this reason, the indicator 20 is referred to in the ensuing description as a job status indicator, or simply a status indicator. The job status indicator is controlled by the timer 22 in the manner hereinafter explained.

The availability and job status indicators 18 and 20 have two different operating states. In one of its operating states, the availability indicator 18 indicates that the corresponding mechanic is unoccupied and hence available to assume a new job assignment. This operating state of the indicator is hereinafter referred to as its unoccupied state. In its other operating state, the availability indicator 18 indicates that the mechanic is occupied with a current job assignment and hence unavailable to assume a new job assignment. This state of the indicator is hereinafter referred to as its occupied state. The work status indicator 20, in one of its operating states, indicates that the job assigned to the corresponding mechanic has not yet been completed. This operating state of the indicator is referred to as its uncompleted state. In this operating state of the work status indicator 20, the corresponding timer 22 registers the length of time the mechanic has been engaged on his assigned task and the length of time required for the mechanic to complete the task. In its other operating state, the job status indicator 20 indicates that the job assigned to the corresponding mechanic has been completed. This operating state of the indicator is hereinafter referred to as its completed state.

It is significant to recall here that the job status indication provided by each job status indicator 20 and its respective timer 22 is based on an estimate of the time required to perform a selected task and not on the actual completion status of the assigned task. However, the times required for average mechanics to complete various automobile repair and servicing jobs has been determined with some accuracy. The estimated job times which are preset into the present work scheduling apparatus will be based on these actual time figures. Accordingly, the job time estimates which are preset into the present work scheduling apparatus will reflect, with a high degree of accuracy, the actual times required to complete the various assigned tasks, and the scheduling apparatus will provide a reasonably accurate indication of the current work status of each mechanic and job assignment.

Briefly, in use of the present work-scheduling apparatus 10, each of the indicator sets 16 will be assigned to a particular mechanic. The mechanic's name may be displayed on the panel 14, adjacent his corresponding indicator set. When a job comes in, a job card 24 is prepared and the job is assigned to one of the mechanics. The work scheduler inserts the job card into a slot 26 just below the indicator set 16 corresponding to the selected mechanic. As will appear presently, this action causes the respective availability indicator 18 to change from its "unoccupied" state to its "occupied" state, thus indicating that the mechanic is unavailable to accept another job assignment. When the job is actually given to the mechanic, the schedular sets the timer 22 at the time estimated to complete the job. Setting of the timer causes the job status indicator 18 to change from its "completed" state to its "uncompleted" state, thus indicating that the job assigned to the mechanic is not yet completed. This action is repeated for each job as it comes in the shop.

Return of any timer 22 to its zero position, at the expiration of the estimated job completion time for which the timer was initially set, causes the corresponding work status indicator 20 to change from its "uncompleted" state to its "completed" state. This indicates to the scheduler that the job assigned to the corresponding mechanic should now be completed. When the mechanic actually finishes the job, the corresponding job card 24 is removed from its panel slot 26. This restores the respective availability indicator 18 to its "unoccupied" state to indicate to a scheduler that the mechanic is now available to receive a new job assignment.

Referring now in more detail to the embodiment of the invention which has been selected for illustration in the drawings, the housing 12 of the work-scheduling apparatus has a thin flat rectangular shape. In addition to the front panel 14, the housing includes a back panel 28 and edge walls 30. The edge walls 30 are joined to the edges of the front and back panels 14, 28 and join the latter in spaced parallel relation. As may be best observed in FIGS. 2 and 5, each of the availability and job status indicators 18, 20 comprise small electric bulbs which are mounted in sockets 32 secured to the rear side of the front panel 14. In the particular embodiment of the invention shown, the several bulbs are arranged in two horizontal rows. The front panel 14 has openings through which the indicator bulbs 18, 20 are visible. If desired, these openings may be covered with transparent windows 34. Preferably, the availability indicator bulbs 18 and the job status bulbs 20 are distinguished in some way. In the illustrated work scheduling apparatus, this is accomplished by providing these bulbs with different colored windows 34. Thus, as indicated in FIG. 5, the windows for the availability indicator bulbs 18 are green and the windows for the job status indicator bulbs 20 are red. It will now be understood, therefore, that when an availability indicator bulb 18 is energized, it provides a green light indication to the work scheduler. When a job status indicator bulb 20 is energized, it provides a red light indication to the work scheduler. For this reason, the indicator bulbs 18 and 20 are hereinafter referred to in places as green and red bulbs, respectively.

As noted earlier and illustrated in FIG. 1, the indicator bulbs 18, 20 are arranged in two horizontal rows. Similarly, the timers 22 are arranged in two horizontal rows directly below the rows of indicator bulbs, respectively. Each timer 22 is located directly below the two indicator bulbs 18, 20 of the respective indicator sets 16. The slots 26 in the front panel 14 which receive the job cards 24 are located directly below their respective indicator sets 16. Along the bottom of the front panel 14 of the work-scheduling apparatus 10 are power switches 36 for the apparatus.

Turning now to FIGS. 2 and 5, it will be seen that electrical power for energizing the indicator bulbs 18 and 20 is supplied to the apparatus through a pair of electrical power leads 38 and 40. The availability indicator bulbs 18 are connected in parallel to these leads through job card switches 42. These job card switches are normally closed switches connected in electrical series with the availability indicator bulbs, respectively. Accordingly, assuming that the switches 42 are in their normally closed positions, energizing of the power leads 38, 40 illuminates all of the availability indicator bulbs 18.

Referring to FIG. 2, it will be observed that the job card switches 42 are mounted on the rear side of the front housing panel 14, just below the job card slots 26 in the panel. The switches are arranged in a manner such that insertion of a job card 24 into any slot opens the adjacent job card switch 42. This action darkens the corresponding availability indicator bulb 18. It will now be understood, therefore, that the availability indicator bulbs 18 are illuminated when in their "unoccupied" state and are dark when in their "occupied" state.

As noted earlier, the job status indicators 20 are controlled by their respective timers 22. To this end, each timer 22 operates an electrical switching device 44 which turns the corresponding job status indicator bulb 20 off and on. More specifically, each timer switch 44 illuminates its respective job status indicator bulb 20 when the timer is in its zero position and darkens the bulb when the timer is preset to an estimated job completion time.

To this end, each timer 22 comprises a shaft 46 which is journaled in suitable bearings in the front and rear panels 14, 28 of the work scheduling apparatus. The front end of each timer shaft 46 projects through an opening in the front panel 14. Fixed to the front end of each timer shaft 46 is a handle or knob 48 by which the shaft may be rotated. The knob carries a pointer 50. Imprinted on the front panel 14 about each timer knob 48 are timer indicia 52 corresponding to selected time intervals.

Each timer switch 44 comprises a contact disc 54 of electrical insulating material. This disc carries an electrically conductive strip 56 which extends in chordwise fashion across the disc. The contact disc 54 of each timer is concentrically mounted on the corresponding timer shaft 46 between the front and rear panels 14, 28 of the housing 12 in such a way that the conductive strip 56 is located at the front side of the disc facing the panel 14.

In addition to the contact disc 54, each timer switch 44 comprises a pair of electrical contacts or brushes 58, 60. These timer brushes are mounted on the rear side of the front housing panel 14 and bear yieldably against the front side of the corresponding timer contact disc 54. As will be explained presently, the contact disc 54 of each timer 44 is driven in rotation at a constant speed by a clock motor 62.

Each timer switch 44 is arranged in such a way that in one angular position of its contact disc 54, the conductive strip 56 on the disc is disposed to simultaneously engage both timer brushes 58 and 60. This position is illustrated in broken lines in FIG. 4 and in FIG. 5. Under these conditions, a circuit is completed between the contact brushes. This condition of each timer switch 44 is referred to as its closed condition. Rotation of the contact disc from its closed position of FIGS. 4 and 5, as, for example, to the position illustrated in full lines in FIG. 4, rotates the conductive strip 56 out of engagement with the timer brushes 58 and 60. In this condition of each timer switch, hereinafter referred to as its opened condition, the electrical circuit between the timer brushes 58 and 60 is interrupted.

Referring now particularly to FIG. 5, it will be observed that the work status indicator bulbs 20 are connected in electrical parallel between the power leads 38 and 40 through their respective timer switches 44. Thus, one terminal of each bulb 20 is connected directly to the power lead 40. The other terminal of the bulb is connected to one brush 58 of its respective timer switch 44. The other brush 60 of the timer switch is connected to the other power lead 38. It is now evident, therefore, that if the power leads 38 and 40 are energized, each work status indicator bulb 20 will be illuminated whenever its respective timer switch 44 is in its closed condition. The bulb will be darkened whenever the timer switch is in its opened condition.

As noted earlier and illustrated in the drawings, the timers 22 of the present work scheduling apparatus 12 are arranged in two horizontal rows. The timer shafts 46 in each row are drivably coupled to a clock motor 62 through a power train now to be described. Each clock motor has a shaft mounting a pinion 64. This pinion meshes with an idler gear 66 mounted on an idler shaft 68. Idler shaft 68 is located between and in the common plane of a pair of adjacent timer shafts 46. The idler shaft extends between and is supported by the front and rear panels 14, 28 of the housing 12. Located between the remaining timer shafts 46 are additional idler shafts 70 mounting idler gears 72.

The several time and idler shafts in each row of timers 22 are located in a common plane. Rotatable on each timer shaft 46 is a gear 74. The several idler and timer gears 66, 72, and 74 have the same pitch diameter and number of teeth and are arranged with the adjacent idler and timer gears in meshing engagement. It is now evident, therefore, that the several timer gears 74 of the timers 22 in each of the horizontal timer rows are driven in rotation in unison from the adjacent clock motor 62, and that the timer gears 74 all rotate in the same direction.

Each timer gear 74 is drivably coupled to its timer shaft 46 by an essentially friction clutch device 76. This clutch device is effective to cause rotation of the shaft, when unrestrained, with the gears and yet permit the shaft to be held stationary and to rotate relative to the gear. Various clutch devices may be employed for this purpose. The clutch device illustrated includes a toothed ratchet wheel 78 fixed to the timer shaft 46 and a ratchet pawl 80 in the form of a leaf spring fixed to the timer gear 74. The pawl engages the toothed edge of the ratchet wheel. The sloping faces of the ratchet teeth on the ratchet wheel 78 face in a direction opposite to that in which the timer gear turns. Pawl spring 80 bears against the ratchet wheel teeth with sufficient pressure to drive the wheel, and hence the timer shaft 46, when the latter is unrestrained. A pin 82 may be fixed to the timer shaft 74 to engage the pawl spring adjacent the ratchet wheel in such a way as to provide effective driving pressure of the spring against the wheel. Because of the resiliency of the pawl spring 80, the timer shaft 46 and its ratchet wheel 78 may be held stationary or turned relative to the timer gear 74 in a direction opposite to the direction of gear rotation. In each case, the pawl spring rides over the sloping faces of the ratchet teeth on the ratchet wheel to accommodate relative rotation of the gear and ratchet wheel.

Each timer 22 is equipped with a stop 84 for limiting rotation of its timer shaft 46 with and in the direction of rotation of its timer gear 74. Accordingly, if the timer shaft is not held against rotation, it will turn with its timer gear to a position wherein the stop arrests the shaft. The gear will then continue to rotate under the driving power of the corresponding clock motor 62, while the timer shaft remains stationary in its arrested position. In this position, the pointer 50 of the timer registers with the zero mark on the timer time scale 52. The timer contact disc 54 then occupies its broken line position of FIG. 4, wherein the conductor strip 56 on the disc engages the timer brushes 58, 60 to illuminate the corresponding job status indicator bulb 20.

The manner in which the present work-scheduling apparatus is used is now obvious. Thus, the various mechanics whose work is to be scheduled with the aid of the apparatus are assigned jobs by insertion of suitably prepared job cards 24 into the appropriate card slots 26. Insertion of a job card into any one of these slots opens the adjacent availability indicator switch 42 and thereby turns off the corresponding availability indicator bulb 18 to indicate to the work scheduler that the mechanic involved is occupied with a job assignment. The work scheduler then presets the corresponding timer 22 to the estimated completion time for the assigned task by rotating the timer knob 48 to a position wherein its pointer indicates the estimated time on the time scale 52. This latter action rotates the timer contact disc 54 from its zero time, broken line position of FIG. 4, and thereby turns off the corresponding job status indicator bulb 20. When the knob is thus preset and then released, the timer shaft 46 immediately commences to be driven in rotation by the associated clock motor 62. The shaft turns in a direction to return the pointer 50 on the knob to its zero time position. When the pointer finally reaches this position, the corresponding job status indicator bulb 20 is again illuminated to signal completion of the task assigned to the respective mechanic. Subsequent withdrawal of the time card 24 from its slot 26 illuminates the availability indicator bulb 18 to signal that the mechanic is available to assume a new job assignment. It will be understood, of course, that the above described operation of the work scheduling apparatus applies to each of the indicator sets 16.

What is claimed as new in support of Letters Patent is:

1. Work-scheduling apparatus comprising:
   a panel mounting a number of indicator sets to be assigned to different work-performing media;
   each indicator set including first and second indicator lamps,
   said first indicator lamp being an availability indicator for indicating the availability of the respective medium to assume a new job assignment and being adapted to be illuminated to indicate said medium is occupied and darkened to indicate said medium in unoccupied, said second indicator lamp being a job status indicator for indicating the estimated status of completion of an assigned job, switch means in each indicator set for illuminating the respective availability indicator lamp when a job is assigned to the corresponding medium and darkening the latter lamp when the medium is available for a new job assignment, and presettable timer means including a single timing motor, a timer presetting means for each indicator set which is adjustable from a zero position to a range of timing positions representing different estimated job completion time intervals, and timing switch means operatively connected to each presetting means and said motor and responsive to adjustment of said presetting means from said zero position to any selected position within said range representing a selected estimated job completion time interval for illuminating the corresponding job status indicator lamp throughout the selected time interval and returning said presetting means to zero position and darkening the corresponding status indicator lamp at the expiration of the selected time interval, and means in each indicator set for indicating the time remaining in the selected time interval.

2. Apparatus according to claim 1 wherein:
   each indicator set includes means for receiving a job card, and
   said availability indicator switching means of each indicator set comprises means to be actuated by a job card inserted into the corresponding card-receiving means.

3. Apparatus according to claim 1 wherein:
said timer presetting means of each indicator set comprises a shaft rotatably supported by said panel, and means for manually turning said shaft from a zero position through a range of angular timing positions,
said timing switch means of each indicator set comprises an electrical contact disc fixed on the corresponding timer shaft for rotation with said shaft, contact brush means on said housing, and conductor means on said disc for engaging said brush means through said range of timing positions, only,
said timer means further comprise means drivably connecting said motor to all the individual timer shafts in a manner such that each shaft when unrestrained is driven by said motor and each shaft is manually rotatable independently of said motor and the remaining shafts.

* * * * *